United States Patent [19]
Hightower, Jr. et al.

[11] Patent Number: 5,127,223
[45] Date of Patent: Jul. 7, 1992

[54] SOLID ROCKET MOTOR PROPELLANTS WITH RETICULATED STRUCTURES EMBEDDED THEREIN AND METHOD OF MANUFACTURE THEREOF

[75] Inventors: James O. Hightower, Jr.; Tomio Sato, both of Huntsville, Ala.

[73] Assignee: Thiokol Corporation, Ogden, Utah

[21] Appl. No.: 391,712

[22] Filed: Aug. 7, 1989

Related U.S. Application Data

[62] Division of Ser. No. 908,760, Sep. 18, 1986, abandoned.

[51] Int. Cl.⁵ .......................... F02K 11/00; F02G 1/00
[52] U.S. Cl. .......................................... 60/253; 60/255
[58] Field of Search ................. 60/251, 253, 254, 255; 156/74; 427/231, 232, 234, 240, 241, 233

[56] References Cited

U.S. PATENT DOCUMENTS 2,977,885  4/1961  Perry, Jr. et al. .
3,022,735  2/1962  Eberle .
3,109,374  11/1963  Rumbel et al. .
3,109,375  11/1963  Rumbel et al. .

(List continued on next page.)

FOREIGN PATENT DOCUMENTS 4520199  7/1970  Japan .
534900  3/1941  United Kingdom .
660789  11/1951  United Kingdom .
885409  12/1961  United Kingdom .
963490  7/1964  United Kingdom .
1490511  11/1977  United Kingdom .

OTHER PUBLICATIONS

Brochure, "Duocel, a New Basic Design Material", by Energy Research and Generation, Inc.
Technical Report AFRPL-TR-68-232, Dec., 1968, "Foamed Aluminum Propellant Study." Bacon, C. G. and Warren, B. R.
Brochure, "Duocel Foam Metal, a New Basic Design Material for Energy Absorption and Structural Applications", by Energy Research and Generation, Inc.
Brochure, "Duocel Foam Metal, a New Basic Design Material, Passive Omnidirectional Borehold Deformation Gauge", by Energy Research and Generation, Inc.
Brochure, "ERG Evolutionary Basic Design Materials", by Energy Research and Generation, Inc. (3 pages no date).
Brochure, "Reticulated Vitreous Carbon", by Energy Research and Generation, Inc. 1976 (4 pages)
"Scott, Chemotronics Get Reticulation Patents", C&EN, Jun. 7, 1965, pp. 42, 45, 47, 48.

Primary Examiner—Richard A. Bertsch
Assistant Examiner—T. S. Thorpe
Attorney, Agent, or Firm—Madson & Metcalf

[57] ABSTRACT

A linerless rocket motor is provided by the bonding of a reticulated support structure, which is embedded in an homogenous mass of propellant material including an oxidant, to the inner wall of the rocket motor case. An inexpensive, safe, and easy to manufacture igniter is comprised of an homogeneous mass of propellant material including an oxidant and a reticulated support structure embedded therein. A light weight, high crush strength, and high strain capability sliver for a rocket motor comprises a block of inert material and a reticulated support structure of carbon, graphite, or a non-combustible material embedded therein. A rocket motor is prevented from accidental propulsion during a fire by attaching a propellant block to the outer side of the rocket motor base. The propellant block burns and produces heat during the fire to weaken the motor case so that pressure resulting from burning of propellant in the rocket motor will burst a hole in the rocket motor case to relive the pressure. A reticulated support structure is preferably embedded in the propellant block to render the block rigid enough not to deform during long term storage and during field handling and to resist aging conditions which would otherwise cause it to become brittle.

3 Claims, 2 Drawing Sheets

U.S. PATENT DOCUMENTS

| | | | |
|---|---|---|---|
| 3,125,542 | 3/1964 | Haines . | |
| 3,140,663 | 7/1964 | Rumbel et al. . | |
| 3,165,483 | 1/1965 | Gemeinhardt et al. . | |
| 3,171,820 | 3/1965 | Volz . | |
| 3,175,025 | 3/1965 | Geen et al. . | |
| 3,175,030 | 3/1965 | Geen . | |
| 3,187,503 | 6/1965 | Taylor | 60/271 |
| 3,191,535 | 6/1965 | Mulloy . | |
| 3,222,433 | 12/1965 | Makay, Jr. . | |
| 3,230,281 | 1/1966 | Carraz . | |
| 3,308,210 | 3/1967 | Ross . | |
| 3,316,842 | 5/1967 | Schulz | 102/100 |
| 3,367,268 | 2/1968 | Spenadel et al. . | |
| 3,389,025 | 6/1968 | Nix et al. . | |
| 3,499,283 | 3/1970 | Simpkins . | |
| 3,616,841 | 11/1971 | Walz . | |
| 3,664,133 | 5/1972 | Iwanclow et al. . | |
| 3,756,025 | 9/1973 | McCullough . | |
| 3,764,420 | 10/1973 | Sayles . | |
| 3,807,171 | 4/1974 | Anderson | 60/255 |
| 3,811,380 | 5/1974 | Glass . | |
| 3,822,645 | 7/1974 | Alexander . | |
| 3,827,715 | 8/1974 | Lynch . | |
| 3,946,039 | 3/1976 | Walz . | |
| 3,974,306 | 8/1976 | Inamura et al. | 427/231 |
| 4,085,173 | 4/1978 | Lomax, Jr. et al. | 102/102 |
| 4,101,623 | 7/1978 | Webster et al. | 427/231 |
| 4,116,466 | 9/1978 | Gehrig . | |
| 4,254,165 | 3/1981 | Phelps et al. | 427/240 |
| 4,337,218 | 6/1982 | Byrd | 264/3 R |
| 4,370,181 | 1/1983 | Lundstrom et al. . | |
| 4,418,622 | 12/1983 | Foster et al. . | |
| 4,429,634 | 2/1984 | Byrd et al. | 102/290 |
| 4,597,995 | 7/1986 | Snow et al. | 427/231 |
| 4,649,823 | 3/1987 | Bell | 102/289 |
| 4,842,895 | 6/1989 | Crawford et al. | 427/207.1 |

SOLID ROCKET MOTOR PROPELLANTS WITH RETICULATED STRUCTURES EMBEDDED THEREIN AND METHOD OF MANUFACTURE THEREOF

This is a divisional of co-pending application Ser. No. 908,760 filed on Sep. 18, 1986, now abandoned.

The present invention relates to solid rocket motor propellants with reticulated structures embedded therein.

It has been suggested in U.S. Pat. No. 3,191,535 to Mulloy to prepare a solid propellant which consists essentially of a cellular fuel element having uniform interconnecting spherical voids of a metal or metal alloy, and a propellant material filling the voids.

It has also been suggested in U.S. Pat. Nos. 3,616,841 and 3,946,039 to Walz that form retaining reticulated structures of metal or the like may be used as solid propellant reinforcement and burning rate modifiers. These Walz patents, which are hereby incorporated herein by reference and made a part of this specification, describe methods for producing such a reticulated structure by using as a pattern a self-supporting reticulated polyurethane or organic foam formed of ligaments to provide a substantially homogeneous reticulated structure which may have a wide range of pore sizes, varying from 3 to 125 pores per linear inch, and the finished foam material is characterized as having ligaments which are continuous, gas-free or of low porosity, and of integral construction.

For high web fraction motors, those having a web fraction greater than about 0.75, commonly used solid propellants do not normally bond sufficiently to rocket cases. Liners of thicknesses normally in the range of 0.01 to 0.04 in., which adhere to both rocket cases and propellants, have been used between the propellant and rocket case to provide such bonds. However, not only do liners require an extra step in the manufacturing process and thus increase the expense of building a rocket motor, but liners also decrease the volume which would otherwise be available for propellant in rocket motor cases. Therefore, it is an object of the present invention to provide a linerless rocket motor.

It is another object of the present invention to provide a method of constructing a rocket motor with a reticulated structure embedded in the propellant grain.

It is a further object of the present invention to provide a method for constructing a linerless solid propellant rocket motor by using the grain as a mandrel.

The construction of igniters by the pelletizing of a mixture of potassium nitrate and boron powders is an expensive process and includes the hazards associated with the handling of small particle fuel (metal) powders.

It is therefore still another object of the present invention to provide an igniter which is easier and less expensive to manufacture.

It is yet another object of the present invention to provide an igniter wherein the process for manufacture thereof is safer and eliminates the hazards involved in the handling of small particle fuel (metal) powders.

It is yet another object of the present invention to provide an igniter wherein the igniter material can be preshaped to any shape desired.

It is another object of the present invention to provide greater flexibility in choice of fuel and oxidizing additives for an igniter.

Jet fuel spillage on the landing decks of aircraft carriers may result in fires. Tactical air-launched rocket motors are often located on the decks in position where they may be subject to accidental ignition from such fuel fires. It is desirable that a rocket motor be non-propulsive if accidental ignition thereby results.

It is therefore another object of the present invention to provide a method for protecting a rocket motor from propulsion during an accidental fire.

Slivers are portions of inert material which are placed alongside the case walls of solid propellant rocket motors at predetermined positions to control pressure and thrust time traces during rocket motor burnout (tail off). Slivers composed of rubber gumstocks have high density (high inert weight). Slivers composed of epoxide binders filled phenolic microballons have low crush strength (less than 2000 psi) characteristics and low strain (less than 3%) capability. High performance rocket motors which employ lightweight composite cases and which operate at high pressures, i.e., greater than 2000 psi require low density, high strength, and high strain capability slivers.

It is therefore still another object of the present invention to provide for a rocket motor a low density sliver which also has high crush strength for withstanding high operating pressures in the motor.

It is yet another object of the present invention to provide such a low density high strength sliver which has high strain capability, i.e., in excess of 10%.

The above and other objects, features, and advantages of this invention will be apparent in the following detailed description of the preferred embodiments thereof which is to be read in connection with the accompanying drawings.

DETAILED DESCRIPTION OF THE PREFERRED EMBODIMENTS

Figure 1:
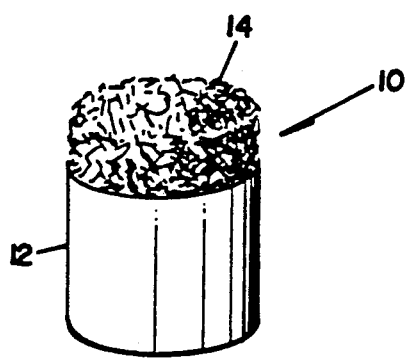
FIG. 1 is a perspective view of a propellant grain portion with a reticulated structure embedded therein but with a portion of the reticulated structure left unfilled with propellant mass to better illustrate the reticulated structure of the present invention.

Referring to FIG. 1, there is illustrated at 10 a solid propellant grain portion which includes an homogeneous mass 12 of propellant material including a suitable oxidant in which is embedded a reticulated structure 14 of combustible or non-combustible material to provide structural support to the mass 12 to hold the propellant mass together during high acceleration forces which may be developed. If it is not necessary that the propellant be smokeless, it is preferred that the reticulated structure 14 be composed of a combustible material such as, for example, aluminum, boron, beryllium, or copper so that it will also burn as the homogeneous mass of propellant burns to provide increased energy. However, if it is desired that the propellant be smokeless, it is preferred that the reticulated structure 14 be composed of carbon, graphite, or a non-combustible material such as, for example, boron, nitride, silicon carbide, alumina, or a high melting point metal such as titanium or a zirconium-titanium alloy. Although carbon and graphite may be combustible under some conditions such as if the propellant mass is oxygen rich, carbon and graphite produce non-smoke producing carbon dioxide when they burn. For the purposes of this specification and the claims, the term "homogeneous mass of propellant material" refers to a propellant material of uniform structure or composition and is meant to include propellant mixtures commonly known as composite propellants as well as homogeneous propellant compounds commonly known as homogeneous propellants. A portion of the grain 10 has been left unfilled with propellant material in order to better illustrate the reticulated structure 14 which is an isotropic structure similar to the structures described in the Walz patents previously referred to. Such a structure is composed of a multitude of ligaments which are of generally uniform dimension and interconnected with each other to form voids which are open to each other so that they may be filled with propellant or other material. For the purposes of this specification and the claims, the term "reticulated structure" is meant to refer to a structure which is composed of a multitude of ligaments interconnected with each other to form voids whch are open to each other and includes such a structure as described in the Walz patents. Grains containing such reticulated or foamed structures may be utilized in tactical and strategic motors, strap-on boosters, hypervelocity applications, rocket associated projectiles, and other applications and are especially desired for supporting the grains during the high accelerations of rockets which are expected to be developed in the future.

Figure 2:
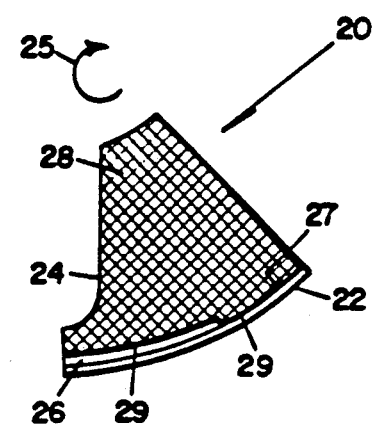
FIG. 2 is a sectional view of a portion of a solid propellant rocket motor embodying an aspect of the present invention.

Since for high web fraction motors, i.e., those motors having a web fraction greater than 0.75, commonly used solid propellants do not normally bond sufficiently to rocket cases, liners which adhere to both rocket cases and propellants have been used between the rocket cases and propellants to provide such bonds. By "web fraction" is meant the difference between the outside radius and bore radius of a grain which difference is divided by the outside radius thereof. The use of a liner for bonding of the propellant material to the case wall in a rocket motor not only adds an additional manufacturing step to the rocket motor manufacturing process and thus increases the expense of building a rocket motor, but the liner, which normally has a thickness in the range of 0.01 to 0.04 inches, also takes up space in the rocket motor which could otherwise be utilized to provide additional propellant for greater energy. Referring to FIG. 2, there is shown a rocket motor portion 20 including a case 22 and a propellant grain 24. A layer of insulation 26 may be provided over all or a portion of the case as necessary to prevent overexposure of the case to the heat of combustion of the propellant. Some rocket motors do not require insulation between the case and grain. In order to eliminate the liner from the rocket motor 20 in accordance with the present invention, the grain 24, which is composed of an homogeneous mass of propellant material including an oxidant, is caused to engage the inner wall 27 of the case 22, and a reticulated structure 28, similar to reticulated structure 14 in FIG. 1, of combustible or non-combustible material is embedded in the grain 24 and bonded such as, for example, by welding, by brazing, by adhesion, or by rigid contact to the inner wall 27 of the case 22. By "bonding of the reticulated structure to the inner wall of the case" is meant, for the purposes of this specification and the claims, bonding of the reticulated structure to the inner wall of the case and/or insulation, if any, applied to the inner wall of the case. Bonding of the reticulated structure 28 to layer of insulation 26 may be achieved by a mechanical lock occuring when ligaments of the reticulated structure are embedded in the insulation material.

In accordance with a preferred method of bonding the reticulated structure 28 to a motor case 22, the reticulated structure 28 is caused to adhere to the case 22 by use of a suitable adhesive, illustrated at 29 in FIG. 2, such as, for example, a liquid curable rubber afterwhich the propellant material is poured into the case 22 and in and around the ligaments of the reticulated structure 28 and is cast therein, i.e., allowed to harden to form a grain. The adhesive material 29 is applied preferably by pouring it into the case 22 and spinning the case with the reticulated structure contained therein, as illustrated at 25 in FIG. 2, and in engagement with the inner wall 27 like a centrifuge to sling the adhesive material against the case wall 27 and form a uniform layer thereon. Such spinning should be continued until the adhesive material 29 has set up and bonded the reticulated structure 28 to the wall 27. If the adhesive material 29 is a good thermal insulator such as, for example, a hydrocarbon rubber, it may also be used to provide some or all of the insulation 26.

In accordance with an alternative method of bonding the reticulated structure 28 to a motor case 22, the reticulated structure 28 is embedded in the case 22 and suitable crush forces, which can be determined by application of engineering principles commonly known to those of ordinary skill in the art to which this invention pertains, are applied to the reticulated structure 28 to cause rigid adhering contact thereof with the case wall 27.

Figure 3:
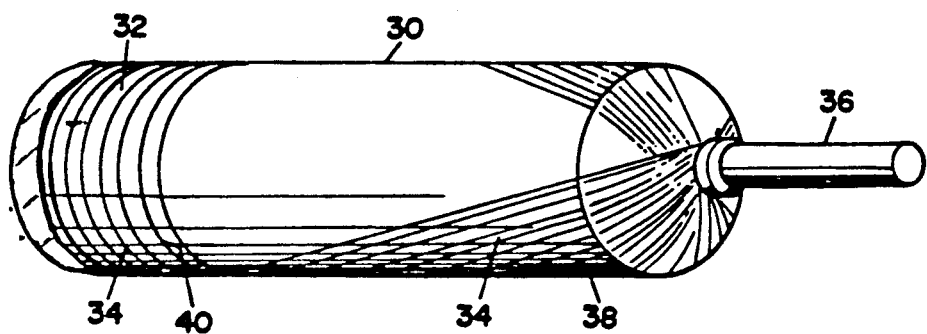
FIG. 3 is a stress-strain diagram for propellants reinforced with reticulated structures and one which is unreinforced.

FIG. 3 is a schematic view illustrating another preferred method of bonding a reticulated structure to a rocket motor case to construct a linerless solid propellant rocket motor. In accordance with this method, a solid propellant grain 30 with a reticulated support structure embedded therein is prepared. Then, in accordance with an aspect of the present invention, a case 32 is constructed about the grain by, for example, winding with a suitable composite/fiber such as epoxy coated tapes 34 of, for example, graphite, aramid, glass, or metal fiber. Thus, the grain 30 is used as a mandrel supported by a suitable member 36 for constructing the case 32. For clarity, it should be noted that the grain 30 of FIG. 3 is shown as having a case 32 only partially constructed thereon. In order to provide a bond between the propellant grain 30 and the case 32 being constructed thereon, a suitable compressive stress, which may be determined by applying engineering principles of common knowledge to those of ordinary skill in the art to which this invention pertains, is applied between the case and the grain during the winding process. In order to provide adequate strength to the case 32 in both the circumferential and longitudinal directions, the tape 34 is wound first in the polar direction, as illustrated at 38, and then in the cylindrical direction, as illustrated at 40, to overlay the polar winding in the cylindrical portion thereof.

Figure 4:
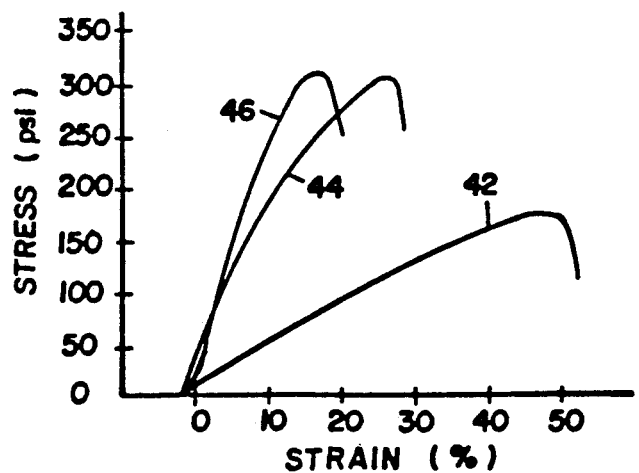
FIG. 4 is a schematic view illustrating a method of constructing a case about a propellant grain in accordance with a method of the present invention.

FIG. 4 shows a stress-strain diagram for an unreinforced propellant at 42 and the propellant reinforced with 10 pores per linear inch and 20 pores per linear inch respectively reticulated aluminum similar to that described in the aforesaid patents to Walz at 44 and 46 respectively. The propellant is composed of the following by weight percent:

| | |
|---|---|
| Hydroxy terminated Polybutadiene (binder) | 9.990 |
| Catocene (burning rate catalyst) | 4.000 |
| Aluminum powder (fuel) | 18.000 |
| Ammonium perchlorate (oxidizer) | 68.000 |
| Triphenyl bismuth (cure catalyst) | 0.010 |

The reinforced grains 44 and 46 were composed of the aforementioned propellant with a portion of the aluminum powder replaced by reticulated aluminum so that the reinforced grains contained 13.491 percent aluminum powder and 4.509 percent reticulated aluminum. The tests resulting in the stress-strain diagram were conducted at a temperature of 77° F., a cross head speed of 2 inch/minute, and a specimen gage length of 1.25 inch. FIG. 4 shows the ability of the reinforced propellant to withstand greater stresses at respectively lesser strains, and also shows the capability of the reinforced propellant to be strained by more than about 15% before reaching its yield point. Thus, it has been discovered and FIG. 4 shows that when the reticulated or foamed aluminum is bonded to the case wall, the propellant grain in which it is embedded is capable of withstanding greater stress, i.e., almost twice as much stress as can normally be withstood by the propellant when unreinforced. The ability of propellant grains to withstand high accelerations is related to the modulus of elasticity thereof, i.e., the greater the modulus of elasticity, the better a propellant grain is able to withstand high accelerations. As FIG. 4 also indicates, the modulus of elasticity of a propellant grain as well as the stress it can withstand may be increased greatly by embedding therein a reticulated structure. Such an increase in modulus of elasticity may be on the order of 4 times or more.

Figure 5:
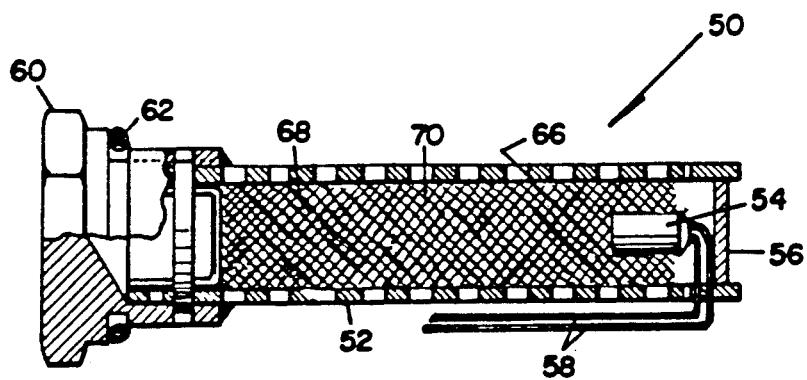
FIG. 5 is a sectional view of an igniter embodying an aspect of the present invention.

Referring to FIG. 5, there is shown generally at 50 an igniter for a rocket motor. The igniter 50 includes a typical elongated cylindrical phenolic case 52, a suitable squib 54 internally of the plug 56 at one end with lead wires 58 extending thereto, and an igniter plug 60 at the other end with a gasket 62 for sealingly mounting the igniter. A plurality of apertures 66 provide communication of the hot gases generated therein to the propellant grain.

Igniter propellant material has typically been prepared by pelletizing a mixture of potassium nitrate and boron powders. However, this is an expensive process and the pelletized material cannot be shaped to a desired monolithic shape. In order to allow pre-shaping of the igniter material and thus, if desired, allow elimination of the phenolic case 52 for added simplicity and cost effectiveness and in order to provide reduced construction costs of the igniter, greater safety to the manufacturing process, and greater flexibility in choice of fuel and oxidizing additives in accordance with the present invention, the igniter 50 is provided with an homogenous mass 68 of propellant material including an oxidant and a reticulated structure 70, similar to reticulated structure 14 of FIG. 1, embedded therein. If the phenolic case 52 is not provided, then a burnable protective tape (not shown), such as tape composed of a synthetic resin polymer sold under the trademark "Teflon", should be applied about the outside of the igniter to serve as an aging protective device. Except for smokeless applications in which case it is composed of carbon, graphite, or a non-combustible material, the reticulated structure 70 is preferably composed of a combustible material, and the igniter 50 is preferably provided with a propellant material composed of potassium nitrate and a reticulated structure 70 of boron embedded therein.

Figures 6, 7:
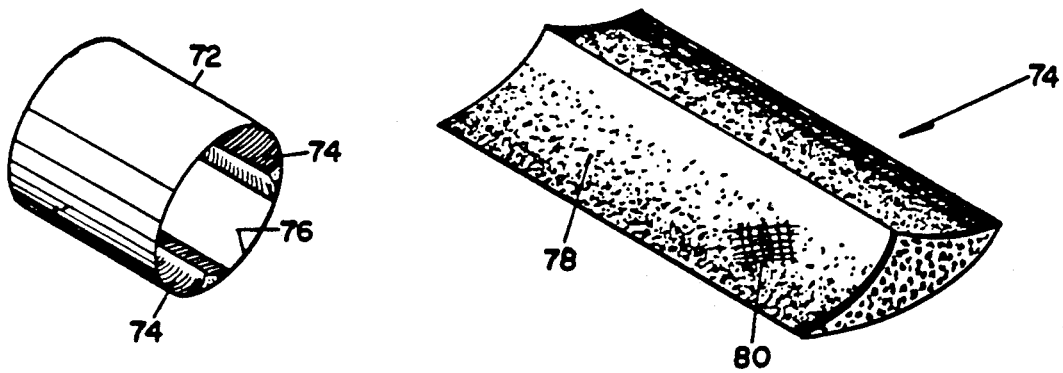
FIG. 6 is a perspective view of a rocket motor case portion including slivers embodying an aspect of the present invention.
FIG. 7 is an enlarged perspective view of a sliver of FIG. 6.
Figure 8:
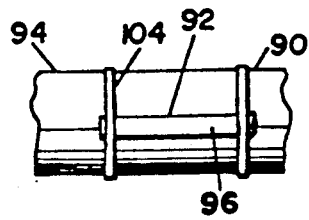
FIG. 8 is a plan view illustrating a method embodying an aspect of the present invention of protecting a rocket motor from propulsion during a fire.
Figure 11:
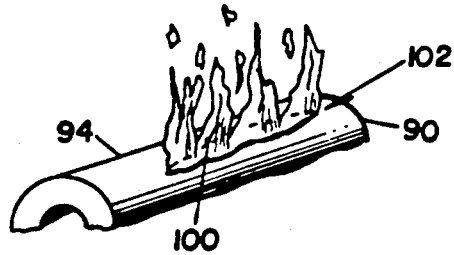
FIG. 11 is a perspective view illustrating the protecting of a rocket motor from propulsion during a fire utilizing a method of the present invention.
Figure 9:
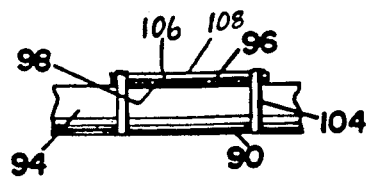
FIG. 9 is a side elevation view thereof.
Figure 10:
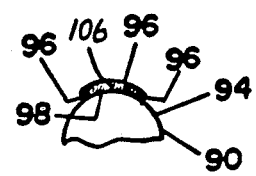
FIG. 10 is an end elevation view thereof.

There are positions alongside the interior walls of rocket motor cases of those rocket motors having certain propellant grain configurations such as those that are star-shaped where, due to the grain configuration, propellant material at such positions would continue to burn after completion of burning of the surrounding propellant material. A sliver, illustrated in position in a rocket motor case 72 at 74 in FIG. 6, is a portion of inert material which is placed alongside the interior wall 76 of a case at such a position to accordingly control pressure and thrust time traces during rocket motor burnout and thus cause a sharp tail-off in pressure at the end of the motor run. Slivers for rocket motors and in particular those which employ light weight composite cases and operate at pressures in excess of 2000 psi should be of light weight, have sufficient crush strength to withstand the motor operating pressures, and have a high strain capability (in excess of 10%). In order to provide such qualities in sliver 74 in accordance with the present invention, the sliver 74 is composed of an inert material 78, preferably of low density, such as, for example, rubber, epoxides, cork, hollow glass spheres, and phenolic microballoons bound together with an epoxide binder and a reticulated support structure, a portion of which is schematically illustrated at 80, of carbon, graphite, or a non-combustible material similar to reticulated structure 14 of FIG. 1, embedded therein. A high crush strength and low density reticulated support structure such as, for example, one composed of cork and aluminum bound together with an epoxide binder is preferred.

A common concern aboard rocket carrying ships is that a shipboard fire may cause propulsion of one or more of the rockets. Propulsion of a rocket may be prevented by providing a pressure relieving hole in the rocket motor case, and it is desired that such a hole be provided automatically and reliably in case of a fire which would otherwise cause rocket propulsion. Referring to FIGS. 8 to 11, in order to accordingly protect a rocket motor illustrated at 90 from propulsion during such a fire in accordance with the present invention, a block 92 of propellant is cast and attached to the rocket motor case 94 with the surfaces illustrated at 96 not contacting the case being insulated and the surface 98 contacting the case remaining uninsulated to thus cause ignition and burning with the production of intense heat on the case exterior along the uninsulated surface 98 for the purpose of thereby weakening the rocket motor case in the area of the uninsulated surface 98. The type and amount of propellant and size of uninsulated surface 98 are chosen by applying engineering principles of common knowledge to those of ordinary skill in the art to which this invention pertains to provide sufficient weakening of the rocket motor case to cause pressure inside the case from burning of rocket propellant therein to burst a hole, illustrated at 100 in FIG. 11, in the side of the case at the weakened site 102 to thus relieve the pressure and make the rocket non-propulsive.

The surfaces 96 insulated with a suitable insulating material illustrated at 108, such as, for example, paper impregnated phenolic material or a rubber based insulation impregnated with a low thermal conductivity filler. It is also desirable that these surfaces 96 be protected against atmospheric conditions and rough handling. Straps 104 are provided to securely hold the propellant block 92 in place. These straps 104 are preferably of a quick-release type so that the block 92 may be quickly removed to fire the missile and are preferably heat resistant to maintain the block 92 in place during burning thereof.

In order to render the block 92 of propellant rigid enough not to deform during long term storage and during field handling and to resist aging conditions which would otherwise cause it to become brittle, a reticulated support structure, illustrated at 106, of preferably combustible material similar to reticulated structure 14 of FIG. 1 is embedded in the propellant block 92.

It is to be understood that the invention is by no means limited to the specific embodiments which have been illustrated and described herein, and that various modifications thereof may indeed be made which come within the scope of the present invention as defined by the appended claims.

What is claimed is:

1. A method of constructing a linerless solid propellant rocket motor comprises the steps of:
   a. inserting a reticulated support structure into a rocket motor case;
   b. bonding the reticulated structure to an inner wall of the rocket motor case; and
   c. pouring propellant material into the rocket motor case and in and around ligaments of said reticulated structure and allowing the propellant material to harden therein, wherein said bonding step includes spinning the rocket motor case with liquid adhesive material and the reticulated structure contained therein to distribute the adhesive material over the inner wall thereof and continuing spinning of the case until the reticulated structure is bonded to the inner wall thereof.

2. A method according to claim 1 further comprises constructing the reticulated structure from a combustible material.

3. A method according to claim 1 further comprising selecting the adhesive material to be composed of a hydrocarbon rubber.

* * * * *